United States Patent [19]

Bister et al.

[11] Patent Number: 4,871,594
[45] Date of Patent: Oct. 3, 1989

[54] USE OF AQUEOUS CATIONIC DISPERSIONS OF SYNTHETIC RESINS FOR IMPREGNATING AND PRIMING OF ABSORBENT SUBSTRATES

[75] Inventors: Erhard Bister, Gross-Zimmern; Hans-Ullrich Huth, Langen; Werner Stelzel, Bad Soden am Taunus, all of Fed. Rep. of Germany

[73] Assignee: Hoechst AG, Fed. Rep. of Germany

[21] Appl. No.: 177,680

[22] Filed: Apr. 5, 1988

[30] Foreign Application Priority Data

Apr. 7, 1987 [DE] Fed. Rep. of Germany ....... 3711681

[51] Int. Cl.$^4$ .............................................. B05D 1/18
[52] U.S. Cl. .................................. 427/430.1; 427/440; 428/320.2; 428/540; 428/541; 524/815; 524/819; 524/820
[58] Field of Search .................. 427/393.6, 393, 430.1, 427/440; 428/540, 541, 320.2; 524/815, 819, 820

[56] References Cited

U.S. PATENT DOCUMENTS

| | | | |
|---|---|---|---|
| 2,965,594 | 12/1960 | Maeder et al. | 260/296 |
| 3,287,305 | 11/1966 | Maeder et al. | 260/29.6 |
| 3,740,367 | 6/1973 | Winkelblech | 260/29.67 TA |
| 4,089,999 | 5/1978 | Mondt et al. | 427/385.5 |
| 4,256,809 | 3/1981 | Larsson et al. | 427/388.4 |

FOREIGN PATENT DOCUMENTS 1053783 3/1959 Fed. Rep. of Germany .
1546236 7/1969 Fed. Rep. of Germany .

OTHER PUBLICATIONS

Emulsion Polymerization, vol. 5 (pp. 801 to 856).
Wochenblatt fur Papierfabrikation, 1981 (pp. 726 to 732).
Organic Coatings Science and Technology, vol. 8 (pp. 227 to 249).

Primary Examiner—Michael Lusignan
Attorney, Agent, or Firm—Bierman and Muserlian

[57] ABSTRACT

Use of finely divided aqueous cationic dispersions of synthetic resins obtainable by emulsion polymerization from suitable monomers and which contain cationic dispersion polymers, as impregnants and primers for consolidating and priming of porous absorbent substrates, preferably inorganic substrates such as, for example, masonry, concrete, plaster surfaces, gypsum surfaces, bricks or wood, by treating these substrates with the aqueous cationic dispersions whose polymer particles have mean particle diameters of 0.02 to 0.2 $\mu$m.

Aqueous cationic dispersions of synthetic resins exhibit a superior penetrating and permeating power, in particular on smooth plaster surfaces and smooth gypsum surfaces, compared with aqueous anionic or non-ionic dispersions of synthetic resins. Moreover they have no tendency to foam formation and can, in contrast to aqueous anionic or non-ionic dispersions of synthetic resins, exhibit a sealing action against staining, water-soluble substances, such as tarry products (tobacco smoke), resins, wood constituents (tanning) and dyes, which is of particular advantage for example in the building trade in the renovation of old buildings.

8 Claims, No Drawings

USE OF AQUEOUS CATIONIC DISPERSIONS OF SYNTHETIC RESINS FOR IMPREGNATING AND PRIMING OF ABSORBENT SUBSTRATES

DESCRIPTION

The invention relates to the use of finely divided aqueous cationic dispersions of synthetic resins containing cationic dispersion polymers for the purpose of impregnating, priming and consolidating absorbent substrates, preferably inorganic substrates, such as, for example, masonry, concrete, plaster surfaces, bricks or wood, the polymer particles of the dispersions having a mean particle diameter of 0.02 to 0.2 μm. Compared with aqueous anionic or non-ionic dispersions of synthetic resins, aqueous cationic dispersions of synthetic resins according to the invention surprisingly exhibit superior penetrating and permeating power, in particular in porous mineral substrates and wood. At the same time, they particularly possess, in contrast to comparable anionic dispersions, a surprisingly advantageous penetrating power even on smooth plaster surfaces, which is of considerable importance in practice.

Primers for the pretreatment of absorbent coating substrates are known. They are required to reduce the absorbency of the substrate and, if necessary, to consolidate it so that a subsequent coating adheres well. To this purpose the primer should penetrate the substrate to be treated as deeply as possible.

It is known that solutions of polymers in organic solvents can meet these requirements. Such impregnants have the disadvantage of representing a health hazard, particularly in enclosed spaces, on account of their high solvent content, and of being flammable and environmentally unsafe.

On the other hand, aqueous dispersions of synthetic resins whose characteristics profile—small particle size, low minimum film-forming temperature (MFT), low solids content and low viscosity—is well suited to the particular application area of priming porous mineral surfaces or even wood, offer outstanding advantages here.

In practice, aqueous anionic dispersions of synthetic resins for the purpose of priming and impregnating absorbent substrates, particularly porous mineral substrates, are already known. However, they have the disadvantage, inter alia, of not having a sufficiently small particle size, nor of penetrating the surfaces sufficiently deeply.

For example, dispersions of polymers of a mean particle size of 0.02–0.1 μm and a solids content of 5–25% by weight for the impregnating and priming of absorbent substrates, are known from German Patent Specification No. 2,531,895. According to this patent specification which only describes anionically stabilized dispersions, it is possible to employ the conventional monomers also used in the preparation of coating dispersions for the preparation of the latices. These products penetrate porous substrates, such as plaster surfaces, concrete, masonry and even wood, if required, relatively well and they consolidate these substrates about as well as polymer solutions, whilst at the same time offering all the known advantages of aqueous systems.

Their disadvantage is that they cannot penetrate and consolidate, for example, smooth gypsum plaster which is a substrate very frequently found in the building industry, but instead they only form a film between the substrate and the topcoat to the detriment of the coating system. As an additional shortcoming, anionic, emulsifier-stabilized dispersions are liable to foam vigorously, both in handling and during application.

The preparation and use of finely divided dispersions containing in part an emulsifier, of acrylic ester polymers containing carboxyl groups, are known from German Offenlegungsschrift 1,595,136. Products of this type are suitable for textile finishing or for the formation of clear protective coatings on metal or, if appropriate, for paints or enamels. They are, however, unsuitable for priming absorbent substrates, in particular of smooth gypsum plaster surfaces.

Cationic dispersions of polymers are already known as such. So far, however, they have not been used in the field of priming and impregnating of porous substrates. They may receive their cationic charge either by incorporation of basic groups, such as primary, secondary or tertiary amino groups in combination with acids, or by polymerization or copolymerization of ethylenically unsaturated trialkyl-ammonium compounds. In addition, emulsion polymerization in the presence of cationic surface-active compounds such as fatty amines or fatty aminoxethylates and quarternary alkylammonium compounds, generally gives rise to stable, positively charged polymer dispersions. Further possibilities of producing cationic products of this type are found in the use of cationic protective colloids, such as, for example, 2,2'azobis(2-amidinopropane) dihydrochloride. Particularly suitable binder dispersions are obtained when at least a part of the cationic charges derives from cationic, built-in monomers.

German Auslegeschrift No. 1,053,783 describes for example the preparation of quaternary ethylenically unsaturated monomeric ammonium compounds by alkylation of basic esters or amides, and their utilization in emulsion polymerization, solution polymerization or block polymerization in conjunction with vinyl esters, styrene, acrylic esters and olefins. If the polymerization is carried out in emulsion, surface-active compounds selected from the group of nonionic or cationic surfactants can be used. The resultant products are suitable as auxiliary substances for the textile, leather and paper industries, but they can also be utilized for the production of films, fibers, adhesives and paints. Nothing is disclosed regarding any particular properties suitable for use on porous, absorbent substrates A process is furthermore known from German Patent Specification No. 1,546,236 for the production of sized paper by treatment of fiber materials or paper webs with aqueous cationic dispersions. The dispersion polymers consist of 20–60% by weight of styrene and/or acrylonitrile, of 20–60% by weight of (meth)acrylic ester and of 5–60% by weight of ethylenically unsaturated compounds possessing a quaternary nitrogen atom. The document, however, makes no reference either to particle size or to the use of emulsifiers for particle-size control or to the employment of such dispersions as binders for priming or impregnating porous absorbent substrates.

It has therefore been the object of the present invention to replace the conventional priming dispersions mentioned by more suitable ones and to avoid the shortcomings referred to.

It has now been found, surprisingly, that not only can finely divided, aqueous, low-viscosity, cationic polymerization dispersions be used advantageously for impregnating, priming and consolidating porous, absorbent substrates, preferably inorganic substrates, such as, for example masonry, concrete, plaster, bricks or even wood, but they can also be used advantageously to impregnate and consolidate smooth plaster, in particular smooth gypsum plaster. This behavior of cationic aqueous dispersions is furthermore also advantageous, since their depth of penetration and the consolidation effect is at least as good as those of known primers based on polymer solutions in inorganic solvents without, however, possessing their shortcomings.

A further advantage of the primers according to the invention based on aqueous cationic dispersions of synthetic resins is, inter alia, that during handling in practice, for example on being drained and transferred from one container to another, or during the priming and impregnating of the substrates to be treated, they virtually do not foam at all or only very slightly.

It is furthermore advantageous if the cation-active aqueous dispersion of synthetic resins to be used according to the invention not only possesses a high cationic activity of at least 20 to 200 μmol per g of solids, measured at pH 7, but that also a high proportion of this cationic charge, preferably 60 to 99%, is situated on the surface of the dispersion particles. The cationic charge of the dispersion can be determined for example titrimetrically in a known manner. Cationic dispersions moreover always have a positive zeta potential.

A further surprising and unexpected advantage, one exceptionally important in practice, of the application of cationic primers according to the invention consists in that they can display a sealing action against staining, water-soluble substances, such as tarry products (tobacco smoke), resins, wood constituents (tannins) and dyes. This can be of particular advantage, for example, in the building trade, especially in the renovation of older buildings, since the overcoated interfering substances referred to above are frequently known to penetrate the freshly applied coatings and give rise to non-uniform coloring, when anionic primers and anionic topcoats are used. On the other hand, when according to the invention the primer is suitably coordinated with the topcoat, for example a cationic primer with a cationic topcoat, or preferably a cationic primer with an anionic topcoat, the permeation of interfering water-soluble staining substances into the coating can be prevented and thus produce, for example in decorative paint systems, the desired paint effect directly without loss.

Accordingly, the subject-matter of the invention is the use of aqueous dispersions of synthetic resins for impregnating and priming of absorbent substrates, wherein the dispersions of synthetic resins are cationic dispersions containing cationic dispersion polymers and the polymer particles of the dispersions have a mean particle diameter of 0.02 to 0.2 μm, preferably 0.08 to 0.15 μm.

According to the invention the cationic dispersions are preferably employed for impregnating and priming porous mineral substrates, particularly preferably masonry, concrete, plaster, smooth plaster, bricks or wood The solids content of the cationic dispersions to be used according to the invention is not critical. It is, however, preferably 3 to 40% by weight, in particular 5 to 20% by weight, based on the dispersion.

In a further preferred embodiment of the invention, the cationic dispersions contain cationic dispersion polymers whose macromolecules contain monomeric units (calculated in percent by weight based on the polymer) selected from the following groups of monomers:

(a) 80–99% by weight of ethylenically unsaturated monomers, preferably selected from the group consisting of vinyl esters, methacrylic esters, acrylic esters and vinyl aromatic compounds;

(b) 1–20% by weight, preferably 1–10% by weight, of ethylenically unsaturated cationic water-soluble monomers which contain, as cationic substituents, quaternized alkylammonium, alkylsulfonium and alkylphosphonium groups, preferably alkylammonium groups, whose alkyl radicals have 1 to 6 carbon atoms, one or more of the alkyl radicals, preferably one, being replaceable by $(C_5-C_7)$-cycloalkyl, $(C_7-C_{24})$-aralkyl, preferably benzyl, or by $-CH_2CONH_2$;

(c) 0–19% by weight of ethylenically unsaturated hydrophilic monomers having one or more functional groups selected from the series $-OH$, $-COOH$, $-NR^1R^2$, wherein $R^1$ and $R^2$, which can be the same or different, stand for H or $-CH_2OR$ ($R=H$ or $(C_1-C_8)$-alkyl); and the dispersions contain furthermore 0.1 to 20% by weight, preferably 0.1 to 7% by weight, of surface-active compounds selected from the group consisting of non-ionic, cationic or amphoteric emulsifiers, as well as, optionally, between 0 and 5% by weight, preferably 0.1 to 2% by weight, of protective colloids, the percentages being in each case based on the total amount of monomers In some cases it may also be advantageous, in particular because of, for example, working costs, if the cationic dispersions of synthetic resins also contain proportions of non-ionic dispersions of synthetic resins, specifically preferably up to 75% by weight, in particular up to 50% by weight, especially preferably up to 25% by weight, of noninoic dispersion polymer, based on the cationic dispersion polymer. The preparation of such mixed products can be carried out, for example, by simple mixing of the corresponding initial dispersions in the desired mixing proportions.

The preparation of aqueous cationic dispersions of synthetic resins according to the invention can take place by conventional emulsion polymerization or emulsion copolymerization, for example by the influx emulsion or pre-emulsion process at 20–100° C., preferably at 50–90° C. In these processes, a portion of the monomers is prepolymerized in the aqueous liquor in a conventional manner and the remainder is added continuously while the polymerization reaction is kept in progress. In order to achieve a particularly high cationic surface charge on the dispersion particles, suitable cationic, salt-like, unsaturated, quaternary monomers, such as alkylammonium, alkylsulfonium or alkylphosphonium compounds, preferably alkylammonium compounds, can for example be added in non-uniform amounts during the course of polymerization, preferably in a larger amount at the start of the polymerization in conjunction with other comonomers. The solids content of the cationic dispersions of synthetic resins obtainable in the emulsion polymerization is in the range that is normal for the preparation of known anionic or non-ionic coating dispersions.

In the preparation by emulsion copolymerization of cationic dispersions of synthetic resins to be used according to the invention, ethylenically unsaturated compounds capable of copolymerization are preferably used as monomeric components in correlation with the group shown above under a), such as, for example, vinyl esters of ($C_1$–$C_{18}$)-carboxylic acids, for example vinyl acetate, vinyl propionate, vinyl versatate, vinyl laurate, vinyl stearate; (meth)acrylic esters of ($C_1$–$C_8$)-alcohols, for example methyl methacrylate, butyl methacry-late, octyl methacrylate, ethyl acrylate, isobutyl acrylate, 2-ethylhexyl acrylate; vinyl aromatic compounds, such as styrene, vinyltoluene; vinyl chloride, ethylene, acrylo-nitrile, diesters of maleic and/or fumaric acid, and vinyl pyrrolidone. The monomers can be used either on their own or mixed. Preferred monomers are those which lead to hydrolysis-resistant and stable dispersion polymers. The guide in the choice of monomers or their mixing ratios are usually the desired application characteristics of the dispersion; to establish these, the usual selection criteria known to the person skilled in the art can come into play.

The following references to the literature are made very generally for information:

F. Hoelscher, Dispersionen Synthetischer Hochpolymerer, Teil 1, Springer Verlag Berlin, Heidelberg, New York (1969); K.O. Calvert, Polymer Latices and their Applications, Applied Science Publishers Ltd., London 1982; E.W. Duck, Encyclopedia of Polymer Science and Technology, Vol. 5, p. 801–856, John Wiley & Sons, New York, 1966.

The minimum film-forming temperature (MFT) of the cationic dispersions of synthetic resins should in particular lie below the range or at most within the range of the proposed application temperatures, i.e. preferably between 0° and 80° C., in particular between 0° and 40° C. When polymers are used with properties that are more difficult to establish, film-forming auxiliary agents or external plasticizers can be employed in order to achieve the required MFT. If such additions are undesirable, the MFT of the cationic dispersion should preferably lie in the range from 0° to 25° C. The following comonomer combinations in combination with cationic monomers are very particularly suitable for the preparation of aqueous cationic dispersions according to the invention, for example in the weight ratios (pbw =parts by weight) given below:

| | |
|---|---|
| Butyl acrylate/methyl methacrylate | 10–90 pbw/90–10 pbw |
| Butyl acrylate/styrene | 10–90 pbw/90–10 pbw |
| Octyl acrylate/methyl methacrylate | 5–80 pbw/95–20 pbw |
| Octyl acrylate/styrene | 5–80 pbw/95–20 pbw |
| Vinyl acetate/butyl acrylate | 40–80 pbw/60–20 pbw |
| Vinyl acetate/vinyl versatate | 50–80 pbw/50–20 pbw |

The type and amount of the quaternizing cationic monomers used in the polymerization, in correlation with the group shown above under b), are of particular importance for the characteristics according to the invention of the cationic dispersions. Preferred cationic monomers of this type are, for example, compounds of the formula (I)

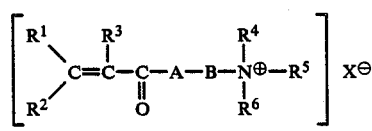

wherein $R^1$, $R^2$, which can be the same or different, preferably denote H, ($C_1$–$C_4$)-alkyl, phenyl which is optionally substituted by ($C_1$–$C_5$)-alkyl groups, $R^3$ denotes H or $CH_3$, $R^4$, $R^5$, which can be the same or different, denote ($C_1$–$C_6$)-alkyl, ($C_5$–$C_7$)-cycloalkyl which is optionally substituted by ($C_1$–$C_5$)-alkyl groups, $R^6$ denotes ($C_1$–$C_6$)-alkyl, benzyl, —$CH_2CONH_2$, A denotes NH or O, B denotes $(CH_2)_{2-4}$, and X denotes an inorganic or organic acid radical, preferably halogen or a ($C_1$–$C_4$)-carboxylic acid.

(Meth)acrylic esters or (meth)acrylamides of the formula (I) are particularly preferred Furthermore diallyldialkylammonium compounds of the formula (II),

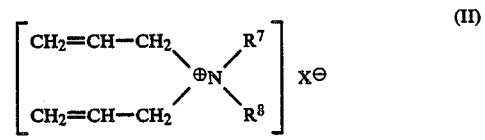

wherein $R^7$, $R^8$, which can be the same or different, denote ($C_1$–$C_{18}$)-alkyl, ($C_5$–$C_7$)-cycloalkyl which is optionally substituted by ($C_1$–$C_5$)-alkyl groups, benzyl, aralkyl having 1 to 18 carbon atoms in the alkyl group which is optionally additionally substituted, and X denotes an inorganic or organic acid radical, preferably halogen or a ($C_1$–$C_4$)-carboxylic acid.

Preferred compounds of the formula (I) are for example trimethylammonium ethyl acrylate chloride, trimethylammonium ethyl methacrylate chloride, dimethyl-n-butylammonium propyl methacrylate bromide, benzyldimethylammonium ethyl methacrylate chloride, trimethylammonium neopentyl acrylate methosulfate, acrylamidopropyltrimethylammonium chloride and methacrylamidopropyltrimethylammonium chloride.

Preferred compounds of the formula (II) are for example diallyldimethylammonium chloride, diallyldiethylammonium chloride, diallyldibutylammonium chloride and diallyldioctylammonium bromide.

Monomers of the formula (I) with an amide structure are particularly preferred for the preparation of hydrolysisresistant dispersions.

It is furthermore a particular advantage for the application according to the invention if the cationic dispersions exhibit as high a cationic activity as possible within a wide pH range. This is generally the case if the total cationic activity of the dispersion amounts to at least 20 to 200 μmol per g of solids, measured at pH 7, and if, in addition, 60 to 99% of the charge is situated on the surface of the dispersion particles. The determination of the cationic activity can be carried out, for example, titrimetrically in a known manner (cf. W. Schempp and H. T. Trau, Wochenblatt für Papierfabrikation 19, 1981, p. 726–732, or J.P. Fischer and K. Loehr, Organic Coatings Science Technology, Vol. 8, p. 227–249, Marcel Dekker, Inc., April 1986).

As regards the characteristics profile of the cationic dispersions of polymers to be used according to the invention, it may in some cases be advantageous to employ further comonomers in the emulsion copolymerisation in correlation with the group shown above under (c), viz. ethylenically unsaturated compounds having functional groups such as —OH, —COOH, —$NR^1R^2$ or -$CONR^1R^2$, wherein $R^1$ and $R^2$ can be the same or different and stand for H or —CH$_2$OR (R =H or (C$_1$-C$_8$)alkyl).

Preferred compounds of this group are for example hydroxyethyl methacrylate, hydroxypropyl methacrylate, polyhydroxypropyl methacrylate, hydroxyethyl acrylate, hydroxypropyl acrylate, polyhydroxypropyl acrylate, methacrylic acid, acrylic acid, maleic acid, fumaric acid, itaconic acid, as well as the half-esters of the last three compounds, dimethylaminoneopentyl methacrylate, dimethylaminoneopentyl acrylate, dimethylaminopropylmethacrylamide, dimethylaminopropylacrylamide, dimethylaminoethyl methacrylate, dimethylaminoethyl acrylate, 2-N-morpholinoethyl methacrylate, 2-N-morpholinoethyl acrylate, t-butylamino-ethyl methacrylate, t-butylaminoethyl acrylate, methacrylamide, acrylamide, N-methylolmethacrylamide and N-methylolacrylamide.

When unsaturated carboxylic acids are used, it is important that their proportion does not exceed 5% by weight and that it is preferably in the range between 0 and 2% by weight, based on the total amount of all monomers. In addition, the zeta potential of the resultant dispersion must on no account become negative.

In order to produce the desired particle size of the dispersion (mean particle size 0.02 to 0.2 μm, preferably 0.05 to 0.2 μm, in particular 0.08 to 0.15 μm), cationic and/or non-ionic and/or amphoteric surface-active emulsifiers are used in the emulsion polymerization in a conventional manner in an amount from 0.1 to 20% by weight, preferably 0.1 to 7% by weight, in particular 1 to 5% by weight, based on the total amount of monomers. It has been found, surprisingly, that the amounts of these emulsifiers required in the cationic dispersions according to the invention do not impair the waterproofing characteristics of priming and impregnating coats.

Suitable emulsifiers are preferably conventional non-ionic surfactants, for example those selected from the group of reaction products of aliphatic, cycloaliphatic, araliphatic, aliphatic/aromatic, aromatic carboxylic acids, alcohols, phenols or amines with epoxides, such as, for example, ethylene oxide, as well as block copolymers formed from various epoxides, such as, for example, ethylene oxide and propylene oxide. Other preferred emulsifiers are for example primary, secondary and tertiary fatty amines in combination with organic or inorganic acids as well as in addition surface-active quaternary alkylammonium compounds. Furthermore, in some cases also amphoteric surfactants with a zwitterionic structure, for example of the betaine type, can be advantageous. The above emulsifiers may be used in the conventional manner either on their own or in combination with one another If required, it is also possible in the preparation of the cationic dispersions to employ at the same time known protective colloids, specifically preferably those based on highmolecular organic compounds which are soluble in, or dispersible in, water, and having essentially no or no marked boundary surface activity and possessing a marked dispersing power. Preferred protective colloids are for example cellulose ethers, polyvinyl alcohols, polysaccharides and polyvinylpyrrolidones, these compounds being preferably substitutable by amino groups or quaternary ammonium groups. The latter groups can be introduced in the basic macromolecule for example by substitution using cation-promoting reagents such as for example glycidyl trimethylammonium chloride. Cationic polyvinyl alcohols can be obtained for example by hydrolysis of the corresponding vinyl acetate copolymers containing amino and/or ammonium groups. The protective colloids to be used depend on the desired dispersion characteristics, in particular the size of the dispersion particles. If required, the amounts of protective colloids used in the emulsion polymerization are preferably between 0 and 5% by weight, in particular between 0.1 and 2% by weight, based on the total amount of monomers.

To initiate the polymerization or copolymerization, all the preferably water-soluble, radical chain initiating systems which can also be of the anionic type conventionally employed in emulsion polymerization, may be used. Preferred initiators are, for example, 2-2'-azobis(2-amidinopropane) dihydrochloride, 2,2'-azobis(N,N'-dimethyleneisobutyramidine) dihydrochloride, 4,4'-azobis(4-cyanovaleric acid), H$_2$O$_2$, t-butylhydroperoxide, persulfates such as ammonium persulfate, sodium persulfate or potassium persulfate, redox systems such as H$_2$O$_2$ and ascorbic acid, peroxides and polyvalent metallic salts, t-butylhydroperoxide and rongalite, wherein redox systems may be advantageous, mainly for reducing the content of residual monomers in the post-reaction phase of the polymerization, as well as high-energy radiation and conventional photoinitiators.

To control molecular weight, it is possible also to use regulators commonly used in emulsion polymerization, such as for example mercaptans or halohydrocarbons for molecular weight reduction, or else, if required, in amounts up to 5% by weight based on the total amount of monomers, ethylenically polyunsaturated or polyfunctional compounds and those capable of cross-linking, such as for example divinylbenzene, ethylene glycol dimethacrylate, ethylene glycol diacrylate, butanediol dimethacrylate, butanedioldiacrylate, triallyl cyanurate, melamine and isocyanatoethyl methacrylate, for molecular weight increase.

For the application according to the invention of aqueous, cationic, finely divided dispersions of synthetic resins as primers and impregnants, their solids content is adjusted preferably to values from 3 to 40% by weight, in particular from 5 to 20% by weight, based on the dispersion. In these preferred solids concentration ranges, the cationic dispersions possess low viscosity and a high penetrating power in absorbent substrates; they develop virtually no interfering foam and can be processed very advantageously.

The invention is explained in greater detail by the examples below.

EXAMPLE 1

2417.8 g of demineralized water, 32.6 g of laurylpyridinium chloride (=3% by weight based on the total amount of monomers), 117 g of a 50% by weight aqueous methacrylamidopropyltrimethylammonium chloride (MAPTAC) and 10% of a mixture consisting of 477.8 g of butyl acrylate, 479.2 g of methyl methacrylate (MMA) and 9.8 g of hydroxyethyl methacrylate (HEMA) are placed in a 4 litre stirred reaction vessel and the mixture is heated to 80° C. After the addition of 3.9 g of 4,4'-azobis(4-cyanovaleric acid) (AVA) as initiator prepolymerization is allowed to proceed for 15 minutes. The remainder of the mixture of monomers is then added over a period of 2 hours. After the addition of 0.98 g of AVA, reaction is allowed to take place for 1 hour at 80° C. and the dispersion is cooled to room temperature. A finely divided cationic dispersion is obtained having a mean particle diameter of 0.067 μm, a cationic activity of 183 μmol/g of solids at a pH of 7 and a solids content of 29.6% by weight (sieve residue <5 g). The cationic dispersion copolymer contains, as monomeric units, butyl acrylate, MMA and HEMA in a weight ratio of 50:50:1, as well as 5.6% by weight of MAPTAC, based on the total amount of monomers. Table 1 contains a summary of the characteristics.

ter of 0.094 μm. Cationic activity is 30 μmol/g of solids at pH 7. The cationic dispersion copolymer contains as monomeric units butyl acrylate, MMA and HEMA in a weight ratio of 65:35:3, as well as 2% by weight of TMAEAC, based on the total amount of monomers. Table 1 contains a summary of the characteristics.

TABLE 1

| Primer examples; proportion of non-cationic monomer units in the dispersion copolymer (weight ratio) | Initiator in the emulsion polymerization | Cationic comonomer (% kg wt. based on total amount of monomers) | Emulsifier (% kg wt. based on total amount of monomers) | Solids content of the dispersion or solution (% by wt.) | Mean particle diameter of the dispersion particle (μm) | Cationic activity of the dispersion at pH 7 (μmol/g of solids) |
|---|---|---|---|---|---|---|
| Example 1 - butyl acrylate/ MMA/HEMA = 50:50:1 | AVA | 5.6% of MAPTAC[1] | 3% of lauryl-pyridinium chloride | 29.6 | 0.067 | 183 |
| Example 2 - butyl acrylate/ styrene/HEMA = 70:30:3 | AVA | 4% of MAPTAC[1] | 2% of lauryl-pyridinium chloride | 29.3 | 0.058 | 91 |
| Example 3 - butyl acrylate/ MMA/HEMA = 65:35:3 | AVA | 2% of TMAEAC[2] | 4% of nonyl-phenol poly-glycol ether (30 EOu) | 32.1 | 0.094 | 30 |
| Comparision Example 1 - anionic dispersion | | | | 34.6 | 0.047 | |
| Comparison Example 2 - polymer resin solution | | | | | | |

[1]MAPTAC = methacrylamidopropyltrimethylammonium chloride
[2]TMAEAC = trimethylammoniumethyl acrylate chloride MAPTAC, based on the total amount of monomers. Table 1 contains a summary of the characteristics.

EXAMPLE 2

Example 1 is modified as follows: Styrene is used instead of MMA and only 2% by weight, based on the total amount of monomers, of laurylpyridinium chloride is used as emulsifier. The resultant cationic dispersion has a solids content of 29.3% by weight and a mean particle diameter of 0.058 μm. Cationic activity is 91 pmol/g of solids at pH 7. The cationic dispersion copolymer contains as monomer units butyl acrylate, styrene and HEMA in a weight ratio of 70:30:3, as well as 4% by weight of MAPTAC, based on the total amount of monomers. Table 1 contains a summary of the characteristics.

EXAMPLE 2

Example 1 is modified as follows: Styrene is used instead of MMA and only 2% by weight, based on the total amount of monomers, of laurylpyridinium chloride is used as emulsifier. The resultant cationic dispersion has a solids content of 29.3% by weight and a mean particle diameter of 0.058 μm. Cationic activity is 91 μmol/g of solids at pH 7. The cationic dispersion copolymer contains as monomer units butyl acrylate, styrene and HEMA in a weight ratio of 70:30:3, as well as 4% by weight of MAPTAC, based on the total amount of monomers. Table 1 contains a summary of the characteristics.

EXAMPLE 3

Example 1 is modified as follows: The ratio of the comonomer components is modified as stated below, and 4% by weight, based on the total amount of monomers, of nonylphenol polyglycol ether with 30 ethylene oxide units (30 EOu) is used as emulsifier. In addition, trimethylammoniumethylacrylate chloride (TMAEAC) is used as the cationic monomer instead of MAPTAC. The resultant cationic dispersion has a solids content of 32.1% by weight and a mean particle diame-

COMPARISON EXAMPLE 1

An anionic primer dispersion, prepared in accordance with German Patent Specification No. 2,531,895, Example 1, using 34.6% by weight of solids and having a mean particle diameter of 0.047 μm, is used as a comparison for the comparative tests described below.

COMPARISON EXAMPLE 2

A solution of a polymer resin for primers, prepared in accordance with German Patent Specification No. 2,531,895, Comparison Example D, with about 30% by weight of solids in ethyl acetate, is used as a further comparison for the comparative tests described below.

The requirements for the characteristics of aqueous deep primers are described in detail for example in the German Patent Specification No. 2,531,895, page 3, line 54 ff in relation to anionic polymer dispersions having a mean particle diameter of 0.02 to 0.1 μm. This German Patent further comprises descriptions of the test methods for penetrating power and adhesion of the deep primer to the treated substrate and of subsequent coatings on the primed substrate.

The aqueous cationic dispersions of synthetic resins used according to the invention were tested for their suitability as deep primers in the application tests described below. Corresponding comparative tests produced results given below.

Application tests

Since the penetrating power of the cationic dispersions on smooth gypsum substrate is, in contrast to that of anionic dispersions, excellent, 0.5 ml of the cationic dispersions diluted to 17% by weight of solids content was applied dropwise both to the dry rough and to the dry smooth gypsum substrate. The anionic dispersion of the Comparison Example 1, also diluted to 17% by weight of solids content, was included as a comparison as was the polymer resin solution of the Comparison Example 2, diluted to 17% by weight of solids content with a commercial organic solvent (Shellsol A) which consists of up to about 80% by weight of aralkyl hydrocarbons of boiling range 165°–185° C. It was demonstrated that the insufficiently penetrating anionic dispersion of the Comparison Example 1 remains lying on the dry smooth gypsum surface and dries forming a film. Accordingly, besides the rate of penetration of the primer, tests were also carried out on the possible formation of surface deposits on the dry, smooth gypsum surface (Test 1). The result is summarized in the Table "Test 1" below.

Penetration into calcium cement plaster was examined on prisms 230 g in weight which were immersed for 1 minute in the cationic dispersion diluted to 17% by weight of solids content. The anionic dispersion of the Comparison Example 1, also diluted to 17% by weight of solids content, was included as a comparison as was the polymer resin solution, diluted to 17% by weight of solids content with Shellsol A (Test 2). The result is summarized in the Table "Test 2" below.

Test 1
Penetration in a gypsum substrate 0.5 ml of a 17% by weight primer are applied dropwise to a gypsum substrate and the penetration is determined after 10 minutes.
1 = complete penetration
3 = surplus deposit (film formation)

| Primer from | on smooth gypsum | on rough gypsum |
|---|---|---|
| Example 1 | 1 | 1 |
| Example 2 | 1.5 | 1 |
| Example 3 | 1.5 | 1 |
| Comparison Example 1 (anionic dispersion) | 3 | 1 |
| Comparison Example 2 (polymer resin solution) | 1 | 1 |

Test 2
Penetration in a calcium cement plaster prism

Weight of prism 230 g, immersed for 1 minute in a 17% by weight primer
Increase in weight of the treated prism after drying at room temperature

| Primer from | (g) |
|---|---|
| Example 1 | 0.26 |
| Example 2 | 0.31 |
| Example 3 | 0.24 |
| Comparison Example 1 (anionic dispersion) | 0.29 |
| Comparision Example 2 (polymer resin solution) | 0.22 |

To assess the foaming of the cationic dispersions, foam produced during application to the substrate of a 17% by weight dispersion is compared with that produced by anionic dispersions. The very slight tendency to foam of the cationic dispersions compared with the intense foaming of the anionic dispersion from comparison example 1 is readily observable. For a quantitative assessment the foam test is carried out in accordance with DIN 53 902. In this test the decrease of a precisely produced amount of foam is observed over 30 minutes. Dispersions with a solids content of about 30% by weight are used for this test (Test 3). The result is summarized in the Table "Test 3" below.

Test 3
Foam test (in accordance with DIN 53 902)

| Primer from | Volume of foam (%) immediate | after 30 min |
|---|---|---|
| Example 1 | 90 | 10 |
| Example 2 | 90 | 0 |
| Comparison Example 1 (anionic dispersion) | 90 | 90 |

The sealing action of cationic dispersion primers and impregnants against staining, water-soluble substances was determined by the following tests.

The sealing action against tarry products was tested on calcium cement plaster substrates that have been previously stored in an atmosphere of tobacco smoke. The sealing action against staining wood constituents was tested on oak.

In the test, the substrate to be treated was first brushed to saturation (primed) with the primer diluted to 17% by weight. After being allowed to dry for 24 hours at room temperature, the primed area is coated with a paint consisting of a customary aqueous acrylate dispersion. When the coating has dried, the discoloration of the paint was assessed. The anionic dispersion of the comparison example 1 also diluted to 17% by weight of solids content and the polymer resin solution of the comparison example 2 diluted to 17% by weight of solids content with Shellsol A were used for comparison in the test (Test 4). The result is summarized in the Table "Test 4" below.

Test 4
Sealing action against staining, colour-soluble substances

One coat of a 17% by weight primer, one top coat of aqueous acrylate resin paint
1 = excellent sealing action
3 = poor sealing action

| Primer from | on calcium cement plaster | on oak |
|---|---|---|
| Example 1 | 1.5 | 1.5 |
| Example 2 | 1.5 | 1.5 |
| Example 3 | 1 | 1 |
| Comparison Example 1 (anionic dispersion) | 3 | 3 |
| Comparison Example 2 (polymer resin solution) | 3 | 3 |

As indicated by the results of Tests 1 to 4, the aqueous cationic dispersion primers according to the invention also penetrate a critical substrate, for example smooth gypsum areas, very well, in contrast to the comparable known anionic dispersion primers. The penetrating power of the aqueous cationic primers according to the invention is just as good as that of comparable known solvent-based primers, without incurring the disadvantages of the latter as a result of its solvent content. The penetration of the aqueous cationic primers according to the invention is not impaired on other substrates either. Foam formation of the cationic dispersions is clearly less intense than that of anionic dispersions. Sealing action against staining, water-soluble substances of the aqueous cationic primers according to the invention is clearly better than that of the comparable aqueous anionic primers and solvent-based primers.

We claim:

1. In a method of impregnating and priming of absorbent substrates with aqueous dispersion of synthetic resins, the improvement comprising using as the dispersions synthetic resins which are cationic dispersions containing cationic dispersion polymers with the polymer particles of the dispersions having a mean particle diameter of 0.02 to 0.2 μm.

2. The method as claimed in claim 1, wherein the cationic dispersions are used for impregnating and priming of porous mineral substrates.

3. The method as claimed in claim 1, wherein the cationic dispersions are used for impregnating and priming of masonary, concrete, plaster, smooth plaster, gypsum plaster, bricks or wood.

4. The method as claimed is claim 1, wherein the solids content of the cationic dispersions is 3 to 40% by weight, based on the dispersion.

5. The method as claimed in claim 1, wherein the minimum cationic activity of the dispersions is 20 to 200 μmol per g of solids, measured at pH 7, and 60 to 99% of the cationic charge is situated on the surface of the particles.

6. The method as claimed in claim 1, wherein the cationic dispersions contain cationic dispersion polymers whose macromolecules contain as part of the polymer monomeric units (calculated in percent by weight based on the polymer) selected form the following groups of monomers:

(a) 80–99% by weight of ethylenically unsaturated monomers selected from the group vinyl esters, methacrylate esters, acrylic esters, vinyl aromatic compounds, vinyl chloride, ethylene, acrylonitrile, diesters of maleic acid and/or fumaric acid or vinylpyrrolidone;

(b) 1–20% by weight of ethylenically unsaturated cationic water-soluble monomers which contain as cationic substituents quaternized alkylammonium, alkylsulfonium and alkylphosphonium groups, whose alkyl radicals have 1 to 6 carbons atoms, one or more of the alkyl radicals, being replaceable by ($C_5$–$C_7$)-cycloalkyl, ($C_7$–$C_{24}$)-aralkyl, or by —$CH_2CONH_2$;

(c) 0–19% by weight of ethylenically unsaturated hydrophilic monomers having one or more functional groups selected from the series —OH, —COOH, —$NR^1R^2$, —$CONR^1R^2$, wherein $R^1$ and $R^2$ which can be the same or different, stand for H or —$CH_2OR$ (R=H or ($C_1$–$C_8$)-alkyl); and the dispersions contain furthermore 0.1 to 2% by weight of surface-active compounds selected from the group of nonionic, cationic or amphoteric emulsifiers, as well as, optionally, between 0 to 5% by weight of protective colloids, the percentages being in each case based on the total amount of monomers.

7. The method as claimed in claim 1, wherein the cationic dispersion copolymers contain as cationic monomer unit 1–20% by weight, based on the copolymer, of compounds of the formula (I),

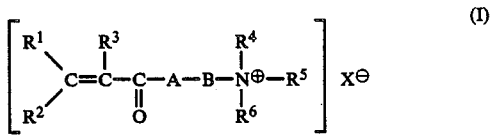

$R^1$, $R^2$, which can be the same or different, denote H, ($C_1$–$C_4$)-alkyl, phenyl which is optionally substituted by ($C_1$–$C_5$)-alkyl groups, $R^3$ denotes H or $CH_3$, $R^4$, $R^5$ which can be the same or different, denote ($C_1$–$C_6$)-alkyl, ($C_5$–$C_7$)-cycloalkyl which can be optionally substituted by ($C_1$–$C_5$)-alkyl groups, $R^6$ denotes ($C_1$–$C_6$)-alkyl, benzyl, —$CH_2CONH_2$, A denotes NH or O, B denotes $(CH_2)_{2-4}$, and X denotes an inorganic or organic acid radical, and/or compounds of the formula (II),

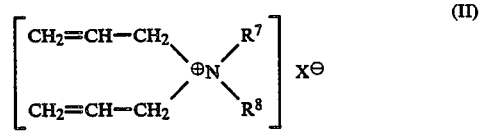

wherein $R^7$, $R^8$, which can be the same or different, denote ($C_1$–$C_{18}$)-alkyl, ($C_5$–$C_7$)-cycloalkyl which is optionally substituted by ($C_1$–$C_5$)-alkyl groups, benzyl, aralkyl having 1 to 18 carbon atoms in the alkyl group which is optionally also substituted, and X denotes an inorganic or organic acid radical.

8. The method as claimed in claim 1, wherein the cationic dispersions of synthetic resins contain a proportion of non-ionic dispersions of synthetic resins.

* * * * *